US012331157B2

(12) United States Patent
Willoughby et al.

(10) Patent No.: US 12,331,157 B2
(45) Date of Patent: Jun. 17, 2025

(54) METHOD OF FORMING A POLYESTER FROM A REGENERATED DIACID FORMED FROM DEPOLYMERIZATION OF A WASTE MATERIAL

(71) Applicant: Circ, LLC, Danville, VA (US)

(72) Inventors: Julie Ann-Crowe Willoughby, Danville, VA (US); Hsun-Cheng Su, Chapel Hill, NC (US); Gheorghe Florin Barla, Beavercreek, OH (US); Timothy Ethan Atwood, Martinsville, VA (US); Allan Stuart Myerson, Cambridge, MA (US)

(73) Assignee: Circ, LLC, Danville, VA (US)

( * ) Notice: Subject to any disclaimer, the term of this patent is extended or adjusted under 35 U.S.C. 154(b) by 0 days.

(21) Appl. No.: 17/946,760

(22) Filed: Sep. 16, 2022

(65) Prior Publication Data

US 2023/0078562 A1    Mar. 16, 2023

Related U.S. Application Data

(60) Provisional application No. 63/244,828, filed on Sep. 16, 2021.

(51) Int. Cl.
*C08G 63/183* (2006.01)

(52) U.S. Cl.
CPC .................................. *C08G 63/183* (2013.01)

(58) Field of Classification Search
CPC .................................................. C08G 63/183
See application file for complete search history.

(56) References Cited

U.S. PATENT DOCUMENTS

| | | |
|---|---|---|
| 4,436,586 A | 3/1984 | Elmore |
| 4,542,239 A | 9/1985 | Lamparter et al. |
| 4,609,680 A | 9/1986 | Fujita et al. |
| 4,769,274 A | 9/1988 | Tellvik et al. |
| 5,133,835 A | 7/1992 | Goettmann et al. |
| 5,151,368 A | 9/1992 | Brimhall et al. |
| 5,153,164 A | 10/1992 | Mason |
| 5,236,959 A | 8/1993 | Oakley et al. |
| 5,411,594 A | 5/1995 | Brelsford |
| 5,580,905 A | 12/1996 | Schwartz, Jr. |
| 6,031,128 A † | 2/2000 | Roh |
| 6,136,869 A | 10/2000 | Ekart et al. |
| 6,410,607 B1 * | 6/2002 | Ekart ........................ C08J 11/24 521/48.5 |
| 6,468,390 B1 | 10/2002 | Shekkenes et al. |
| 6,471,008 B1 | 10/2002 | Iwata |
| 6,545,061 B1 | 4/2003 | Murdoch et al. |
| 6,706,843 B1 | 3/2004 | Ishihara et al. |
| 6,772,767 B2 | 8/2004 | Mua et al. |
| 7,217,338 B2 | 5/2007 | Gustavsson et al. |
| 7,521,493 B2 | 4/2009 | Frances et al. |
| 7,544,635 B2 | 6/2009 | Liang et al. |
| 7,893,122 B2 | 2/2011 | Fregoso-Infante et al. |
| 8,268,126 B2 | 9/2012 | Fang |
| 8,460,898 B2 | 6/2013 | Diner |
| 8,546,560 B2 | 10/2013 | Kilambi |
| 8,546,561 B2 | 10/2013 | Kilambi |
| 8,637,718 B2 | 1/2014 | Gupta et al. |
| 8,679,352 B2 | 3/2014 | Ollivier et al. |
| 8,758,517 B2 | 6/2014 | Henriksson et al. |
| 8,778,134 B2 | 7/2014 | Vehvilainen et al. |
| 9,359,651 B2 | 6/2016 | Kilambi et al. |
| 9,388,529 B2 | 7/2016 | Lindstrom et al. |
| 9,469,693 B2 | 10/2016 | Henriksson et al. |
| 9,611,371 B2 | 4/2017 | Walker |
| 9,751,955 B2 | 9/2017 | Lindstrom et al. |
| 9,902,815 B2 | 2/2018 | Tamminen et al. |
| 10,087,130 B2 | 10/2018 | Essaddam |
| 10,266,610 B2 | 4/2019 | Varhimo et al. |
| 10,300,464 B2 | 5/2019 | Lin et al. |
| 10,322,395 B2 | 6/2019 | Kumar et al. |
| 10,603,651 B2 | 3/2020 | Kumar et al. |
| 11,305,254 B2 | 4/2022 | Kumar et al. |
| 11,332,768 B2 | 5/2022 | Baker et al. |
| 11,414,789 B2 | 8/2022 | Lindstrom et al. |
| 11,421,042 B2 | 8/2022 | Willbert-Keyrilainen et al. |
| 11,618,978 B2 | 4/2023 | Lindgren et al. |

(Continued)

FOREIGN PATENT DOCUMENTS

| | | |
|---|---|---|
| CN | 102392378 | 3/2012 |
| CN | 104327260 A * | 2/2015 |

(Continued)

OTHER PUBLICATIONS

CN 104327260 English translation (Year: 2015).*
Agrupis, Shirley, et al., Industrial utilization of tobacco stalks II: preparation and characterization of tobacco pulp DY steam explosion pulping, The Japan Wood Research Society, 2000, 46, pp. 222-229.
CNIPA, Second Office Action for corresponding Chinese Patent Application No. 201680033630.6, dated Jul. 17, 2020.
CNIPA; Office Action for Chinese Patent Application No. 201680033630.6 dated Sep. 27, 2019, 16 pages.
EPO; Extended European Search Report for European Patent Application No. 16808506.6 dated Mar. 20, 2019, 11 pages.
Hoshio et al. "Extraction of Bamboo Fiber and Biomass Utilization by Hydrothermal Treatment", dated Dec. 2010, 6 pages.

(Continued)

*Primary Examiner* — Ling Siu Choi
*Assistant Examiner* — Andrea Wu
(74) *Attorney, Agent, or Firm* — Dority & Manning, P.A.

(57) ABSTRACT

A method of forming a polyester from a regenerated composition comprising a regenerated diacid and a catalyst obtained from depolymerization of a polyester in a waste material is disclosed. The method comprises: reacting a diol and the regenerated diacid in the regenerated composition to form one or more compounds including an ester bond; optionally providing additional catalyst; and polymerizing the one or more compounds including an ester bond to form a polyester.

21 Claims, No Drawings

(56) References Cited

U.S. PATENT DOCUMENTS

| | | | |
|---|---|---|---|
| 2002/0065430 A1* | 5/2002 | Broccatelli | C08J 11/16 562/483 |
| 2004/0013831 A1 | 1/2004 | Whittaker et al. | |
| 2004/0154760 A1 | 8/2004 | Dean | |
| 2007/0193706 A1 | 8/2007 | Kirove et al. | |
| 2008/0039540 A1* | 2/2008 | Reitz | C08J 11/24 521/48.5 |
| 2008/0097120 A1 | 4/2008 | Jermolovicius et al. | |
| 2009/0053777 A1 | 2/2009 | Hennessey et al. | |
| 2009/0283397 A1 | 11/2009 | Kato et al. | |
| 2009/0318579 A1 | 12/2009 | Ikenaga | |
| 2010/0178677 A1 | 7/2010 | Dunson et al. | |
| 2010/0193116 A1 | 8/2010 | Gamstedt et al. | |
| 2011/0046365 A1 | 2/2011 | Mikkonen et al. | |
| 2011/0209723 A1 | 9/2011 | Sullivan et al. | |
| 2012/0161358 A1 | 6/2012 | Al-Munif et al. | |
| 2013/0192123 A1 | 8/2013 | Maschmerer et al. | |
| 2013/0276801 A1 | 10/2013 | Byrd, Jr. et al. | |
| 2014/0234936 A1 | 8/2014 | Kusuda et al. | |
| 2014/0242684 A1 | 8/2014 | Harlick et al. | |
| 2014/0275299 A1 | 9/2014 | Badwell et al. | |
| 2014/0331993 A1 | 11/2014 | Kumar et al. | |
| 2014/0345341 A1 | 11/2014 | Fiato et al. | |
| 2015/0105532 A1 | 4/2015 | Allen et al. | |
| 2015/0225901 A1 | 8/2015 | Asikainen et al. | |
| 2016/0053058 A1 | 2/2016 | Tabor et al. | |
| 2016/0168315 A1 | 6/2016 | Hernandez et al. | |
| 2016/0311997 A1 | 10/2016 | Rangaswamy et al. | |
| 2016/0326335 A1† | 11/2016 | Schmidt | |
| 2017/0008826 A1 | 1/2017 | Essaddam | |
| 2017/0218162 A1 | 8/2017 | Walker | |
| 2017/0362775 A1 | 12/2017 | Juvonen et al. | |
| 2018/0002837 A1 | 1/2018 | Yu et al. | |
| 2018/0127515 A1 | 5/2018 | Ropponen et al. | |
| 2018/0347111 A1 | 12/2018 | Lee | |
| 2019/0226015 A1 | 7/2019 | Provins et al. | |
| 2019/0255506 A1 | 8/2019 | Kumar et al. | |
| 2019/0338466 A1 | 11/2019 | Brinks et al. | |
| 2019/0345306 A1 | 11/2019 | Walker | |
| 2020/0232162 A1 | 7/2020 | Harlin et al. | |
| 2020/0247961 A1 | 8/2020 | Ferris et al. | |
| 2020/0338531 A1 | 10/2020 | Boualleg et al. | |
| 2020/0407530 A1 | 12/2020 | Barla et al. | |
| 2021/0017353 A1 | 1/2021 | Sramek et al. | |
| 2021/0237317 A1 | 8/2021 | Dubois | |
| 2021/0238380 A1 | 8/2021 | Monsigny et al. | |
| 2022/0073859 A1 | 3/2022 | Splinter et al. | |

FOREIGN PATENT DOCUMENTS

| | | | |
|---|---|---|---|
| CN | 106674588 | | 5/2017 |
| EP | 1383955 | | 1/2010 |
| EP | 3628656 | † | 4/2020 |
| GB | 1562493 | | 3/1980 |
| GB | 2528495 | | 1/2016 |
| GB | 2560726 | | 9/2018 |
| JP | H11269788 | | 10/1999 |
| JP | 2006241380 | | 9/2006 |
| JP | 2009261275 | | 11/2009 |
| JP | 2011032388 | | 2/2011 |
| JP | 2013528715 | | 7/2013 |
| JP | 6346399 | | 6/2018 |
| KR | 101391686 | | 5/2014 |
| WO | WO 9510499 A1 | † | 4/1995 |
| WO | WO2011138633 | | 11/2011 |
| WO | WO2016034727 | | 3/2016 |
| WO | WO 2020234684 A1 | † | 11/2020 |

OTHER PUBLICATIONS

ISA/WO Search Report and Written Opinion for International Patent Application No. PCT/US2016/037188 dated Sep. 12, 2016, 13 pages.

International Search Report and Written Opinion for PCT/US2022/43823, 13 pages, dated Nov. 28, 2022.

JPO, Office Action for corresponding Japanese Patent Application No. 2017-564526, Jul. 28, 2020.

Liguori, Rossana et al. "Bioreactors for lignocellulose conversion into fermentable sugars for product of high added value products", Applied Microbiology and Biotechnology, Nov. 16, 2015 (online), pp. 597-611, vol. 100.

Palme, Anna, et al., Development of an efficient route for combined recycling of PET and cotton from mixed fabrics, Wextiles and Clothing Sustainability, 2017, vol. 3, No. 4, pp. 1-9.

PCT, International Preliminary Report on Patentability, International application No. PCT/SE2008/050837, Aug. 26, 2009.

PCT, International Search Report and Written Opinion, International application No. PCT/US2016/037188 dated Sep. 12, 2016.

PCT, International Preliminary Report on Patentability, International application No. PCT/US2016/037188 dated Dec. 12, 2017.

Toor, S., et al., "Hydrothermal liquefaction of biomass: A review of subcritical water technologies", Elsevier, Energy, vol. 36, 2011, pp. 2328-2342.

USPTO; Non-Final Office Action for U.S. Appl. No. 15/822,414 dated Aug. 10, 2018, 11 pages.

USPTO; Non-Final Office Action for U.S. Appl. No. 16/402,784 dated Jul. 29, 2019, 8 pages.

WIPO; International Preliminary Report on Patentability for International Patent Application No. PCT/US2019/013270 dated Jul. 23, 2020, 6 pages.

Patwary, S. H. "Antimony diffusion from polyester textiles upon exhaust dyeing" The Swedish School of Textiles, Sep. 5, 2017, pp. 1-47.†

Kim. E. S. et al. "Effect of Polycondensation Catalyst on Fiber Structure Development in High-Speed Melt Spinning of Poly (Ethylene Terephthalate)" Polymers, Nov. 22, 2019, pp. 1-14, vol. 11, No. 1931.†

Zhang, F. et al. "Poly(ethylene terephthalate-co-isophthalate) synthesized via a Sb/Al bimetallic compound catalyst: the effect of the end groups on the properties of polyester" RSC Adv., 2017, pp. 21780-21789, vol. 7, No. 21780.†

\* cited by examiner
† cited by third party

METHOD OF FORMING A POLYESTER FROM A REGENERATED DIACID FORMED FROM DEPOLYMERIZATION OF A WASTE MATERIAL

CROSS-REFERENCE TO RELATED APPLICATIONS

This application claims priority to U.S. Provisional Patent Application No. 63/244,828 filed on Sep. 16, 2021, which is incorporated herein by reference in its entirety.

BACKGROUND OF THE INVENTION

In general, polyesters, such as polyethylene terephthalate, are utilized for a variety of applications, such as films, textiles, consumer products. However, these materials have a limited lifespan wherein they primarily end up in a landfill or waste facility. Recently, there has been much interest in reusing and recycling these materials. In some cases, the polyesters can simply be processed easily for reuse. However, in other cases, the polyesters may need to be depolymerized by breaking down the ester bond and reducing the polymer into its monomer components. With such depolymerization, conventional processes require steps ultimately resulting in highly purified monomer components for use downstream, potentially in a polymerization reaction. However, this may have drawbacks, such as requiring additional capital for materials and equipment as well as additional time for processing and downstream polymerization.

As a result, there is a need to provide a process utilizing components from a polyester depolymerization that allows for more efficient polymerization and formation of the polyester.

SUMMARY OF THE INVENTION

In accordance with one embodiment of the present invention, a method of forming a polyester from a regenerated composition comprising a regenerated diacid and a catalyst obtained from depolymerization of a polyester in a waste material is disclosed. The method comprises: reacting a diol and the regenerated diacid in the regenerated composition to form one or more compounds including an ester bond; optionally providing additional catalyst; and polymerizing the one or more compounds including an ester bond to form a polyester.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a method of forming a polyester. In particular, the polyester is formed from a regenerated composition comprising a regenerated diacid and a catalyst. For instance, the regenerated composition is formed by depolymerizing a polyester in a waste material. The present inventors have discovered that the method may allow for a more efficient formation/polymerization of the regenerated diacid with a diol.

The polyester that is formed from the polymerization may include any form of polyester and is not necessarily limited by the present invention. For instance, the polyester may include, but is not limited to, a linear aliphatic polyester, a hyperbranched polyester, a heterocyclic polyester, an aliphatic-aromatic polyester, a wholly aromatic copolyester, etc. In one embodiment, the polyester may comprise a linear aliphatic polyester. In another embodiment, the polyester may comprise an aliphatic-aromatic polyester. In a further embodiment, the polyester may be a heterocyclic polyester.

In particular, the polyester may include, but is not limited to, polyethylene terephthalate, polybutylene terephthalate, polyethylene naphthalate, polylactic acid, polyglycolic acid, poly-ε-caprolactone, polyhydroxybutyrate, polytrimethylene terephthalate, poly(ethylene 2,5-furandicarboxylate), poly(propylene 2,5-furandicarboxylate), poly(butylene 2,5-furandicarboxylate), poly(hexylene 2,5-furandicarboxylate), or a mixture thereof. In one embodiment, the polyester may include polybutylene terephthalate. In one particular embodiment, the polyester may include polyethylene terephthalate.

In one embodiment, the polyester may be a bio-based polyester. In general, these polyesters may be aliphatic polyesters. These bio-based polyesters may include, but are not limited to, polylactic acid, polyglycolic acid, poly-ε-caprolactone, polyhydroxybutyrate, etc., or a mixture thereof.

In addition, the polyester may be a heterocyclic polyester. The heterocycle may include saturated bonds or unsaturated bonds. In one particular embodiment, the heterocycle includes at least one unsaturated carbon-carbon bond. The heterocyclic polyester may include a furan-based polyester. In general, such polyesters may be obtained from 2,5-furan dicarboxylate. For instance, the furan-based polyester may include, but is not limited to, poly(ethylene 2,5-furandicarboxylate), poly(propylene 2,5-furandicarboxylate), poly(butylene 2,5-furandicarboxylate), poly(hexylene 2,5-furandicarboxylate), and their copolyesters.

As indicated above, the polyester is formed from polymerization of a regenerated composition including a regenerated diacid and a catalyst. In this regard, such regenerated composition is formed by depolymerizing a polyester in a waste material. Accordingly, such polyester employed in such depolymerization may be any of the aforementioned polyesters.

The polymerization for formation of the polymer is conducted utilizing the regenerated composition including the regenerated diacid (i.e., dicarboxylic acid) and the catalyst along with a diol. For instance, such a polymerization may be referred to as an esterification reaction or esterification polymerization.

The diacid (or regenerated diacid) employed in the polymerization may include, but is not limited to, a saturated diacid, an unsaturated diacid, or a mixture thereof. In one embodiment, diacid (or regenerated diacid) comprises a saturated diacid. The saturated diacid comprises ethanedioic acid, propanedioic acid, butanedioic acid, pentanedioic acid, hexanedioic acid, heptanedioic acid, octanedioic acid, nonanedioic acid, decanedioic acid, or a mixture thereof.

In one embodiment, the diacid (or regenerated diacid) comprises an unsaturated diacid. For instance, the unsaturated diacid comprises a linear unsaturated diacid, a branched unsaturated diacid, an aromatic diacid, or a mixture thereof. In one embodiment, the unsaturated diacid comprises a linear unsaturated diacid. In another embodiment, the unsaturated diacid comprises a branched unsaturated diacid. In a further embodiment, the unsaturated diacid comprises an aromatic diacid. The aromatic diacid may be polycyclic. For instance, the polycyclic aromatic diacid may include a fused, a bridged, or a spiro aromatic diacid.

For instance, the unsaturated diacid may comprise maleic acid, fumaric acid, glutaconic acid, or a mixture thereof. In one particular embodiment, the aromatic diacid may comprise terephthalic acid, phthalic acid, isophthalic acid, napthalenedicarboxylic acid, or a mixture thereof. In one embodiment, the aromatic diacid may comprise phthalic acid, isophthalic acid, napthalenedicarboxylic acid, or a mixture thereof. In one particular embodiment, the aromatic diacid may comprise terephthalic acid.

As indicated herein, the regenerated composition also comprises a catalyst. Because of the method utilized within the depolymerization of the waste material as described herein, the catalyst within the regenerated composition may maintain its catalytic activity. The catalyst may include antimony, germanium, titanium, cobalt, molybdenum, or a mixture thereof. In one embodiment, the catalyst may include germanium, titanium, cobalt, molybdenum, or a mixture thereof. In one particular embodiment, the catalyst may include antimony. For instance, the antimony may comprise antimony trioxide, antimony acetate (e.g., antimony triacetate aka antimony(III) acetate), antimony glycolate, an antimony/metal composite, or a mixture thereof. For instance, the antimony/metal composite may comprise antimony and a transition metal and/or an alkali metal. In one embodiment, the antimony/metal composite may comprise both a transition metal and an alkali metal. The transition metal may comprise, but is not limited to, cobalt, manganese, zinc, or a mixture thereof. The alkali metal may comprise lithium, sodium, potassium, cesium, or a mixture thereof. In one embodiment, the antimony catalyst may comprise antimony acetate (e.g., antimony triacetate), antimony glycolate, an antimony/metal composite, or a mixture thereof. In one particular embodiment, the antimony may comprise antimony trioxide. In another particular embodiment, the antimony may comprise an antimony acetate, such as antimony triacetate.

The regenerated composition may include a certain amount of the catalyst. In general, such catalyst may be present in the regenerated composition after the depolymerization of the polyester as indicated herein. The catalyst may be present in the regenerated composition an amount of greater than 0 ppm, such as 5 ppm or greater, such as 10 ppm or greater, such as 15 ppm or greater, such as 20 ppm or greater, such as 25 ppm or greater, such as 30 ppm or greater, such as 40 ppm or greater, such as 50 ppm or greater, such as 60 ppm or greater, such as 70 ppm or greater, such as 75 ppm or greater, such as 90 ppm or greater, such as 100 ppm or greater, such as 125 ppm or greater, such as 150 ppm or greater, such as 180 ppm or greater, such as 200 ppm or greater. The catalyst may be present in the regenerated composition in an amount of 350 ppm or less, such as 300 ppm or less, such as 275 ppm or less, such as 250 ppm or less, such as 225 ppm or less, such as 200 ppm or less, such as 190 ppm or less, such as 170 ppm or less, such as 150 ppm or less, such as 130 ppm or less, such as 110 ppm or less, such as 100 ppm or less, such as 90 ppm or less.

In other words, the catalyst may be present in the regenerated composition in an amount of greater than 0 wt. %, such as 0.0005 wt. % or greater, such as 0.001 wt. % or greater, such as 0.002 wt. % or greater, such as 0.003 wt. % or greater, such as 0.004 wt. % or greater, such as 0.005 wt. % or greater, such as 0.006 wt. % or greater, such as 0.007 wt. % or greater, such as 0.0075 wt. % or greater, such as 0.008 wt. % or greater, such as 0.01 wt. % or greater, such as 0.012 wt. % or greater, such as 0.014 wt. % or greater, such as 0.015 wt. % or greater, such as 0.018 wt. % or greater, such as 0.02 wt. % or greater, such as 0.022 wt. % or greater, such as 0.025 wt. % or greater, such as 0.028 wt. % or greater, such as 0.03 wt. % or greater, such as 0.04 wt. % or greater based on the weight of the regenerated diacid. The catalyst may be present in the regenerated composition in an amount of 0.05 wt. % or less, such as 0.048 wt. % or less, such as 0.045 wt. % or less, such as 0.043 wt. % or less, such as 0.04 wt. % or less, such as 0.037 wt. % or less, such as 0.035 wt. % or less, such as 0.033 wt. % or less, such as 0.03 wt. % or less, such as 0.028 wt. % or less, such as 0.025 wt. % or less, such as 0.022 wt. % or less, such as 0.02 wt. % or less, such as 0.018 wt. % or less, such as 0.016 wt. % or less, such as 0.015 wt. % or less, such as 0.013 wt. % or less, such as 0.011 wt. % or less, such as 0.01 wt. % or less, such as 0.009 wt. % or less, such as 0.008 wt. % or less, such as 0.007 wt. % or less, such as 0.005 wt. % or less, such as 0.003 wt. % or less, such as 0.002 wt. % or less, such as 0.001 wt. % or less based on the weight of the regenerated diacid.

The regenerated diacid may be present in the regenerated composition in an amount of 80 wt. % or more, such as 85 wt. % or more, such as 90 wt. % or more, such as 95 wt. % or more, such as 97 wt. % or more, such as 98 wt. % or more, such as 99 wt. % or more, such as 99.5 wt. % or more, such as 99.7 wt. % or more, such as 99.8 wt. % or more, such as 99.9 wt. % or more, such as 99.95 wt. % or more, such as 99.96 wt. % or more, such as 99.97 wt. % or more, such as 99.98 wt. % or more, such as 99.99 wt. % or more. The regenerated diacid may be present in the regenerated composition in an amount of less than 100 wt. %, such as 99.99999 wt. % or less, such as 99.9999 wt. % or less, such as 99.9995 wt. % or less, such as 99.999 wt. % or less, such as 99.995 wt. % or less, such as 99.9 wt. % or less.

In general, the polymerization is conducted in the presence of a catalyst. However, as indicated above, the generated composition may include catalyst obtained from a depolymerization. In this regard, in one embodiment, the polymerization reaction may not require the utilization of any additional catalyst. In another embodiment, the polymerization reaction may require the utilization of additional catalyst. However, because the regenerated composition may already include some catalyst obtained from a prior depolymerization, the amount of additional catalyst provided may be less than typically required. Nevertheless, the additional catalyst may be any catalyst as mentioned above as present in the regenerated composition. For instance, in one particular embodiment, the additional catalyst may include antimony. For instance, the antimony may comprise antimony trioxide, antimony acetate (e.g., antimony triacetate aka antimony(III) acetate), antimony glycolate, an antimony/metal composite, or a mixture thereof. For instance, the antimony/metal composite may comprise antimony and a transition metal and/or an alkali metal. In one embodiment, the antimony/metal composite may comprise both a transition metal and an alkali metal. The transition metal may comprise, but is not limited to, cobalt, manganese, zinc, or a mixture thereof. The alkali metal may comprise lithium, sodium, potassium, cesium, or a mixture thereof. In one embodiment, the antimony catalyst may comprise antimony acetate (e.g., antimony triacetate), antimony glycolate, an antimony/metal composite, or a mixture thereof. In one particular embodiment, the antimony may comprise antimony trioxide. In another particular embodiment, the antimony may comprise an antimony acetate, such as antimony triacetate.

As indicated above, the polymerization also requires a diol. The diol may be, but is not limited to, an aliphatic diol, an aromatic diol, or a mixture thereof. In one embodiment, the diol may comprise an aromatic diol. The aromatic diol may be polycyclic. For instance, the polycyclic aromatic diol may include a fused, a bridged, or a spiro aromatic diol. The aromatic diol may comprise catechol, resorcinol, hydroquinone, or a mixture thereof. In another embodiment, the regenerated diol comprises an aliphatic diol. For instance, the aliphatic diol may comprise ethylene glycol, a butanediol (e.g., 1,2-butanediol, 1,3-butanediol, 1,4-butanediol, 2,3-butanediol), a propanediol (e.g., 1,2-propanediol, 1,3-propanediol), a pentanediol (e.g., 1,5-pentanediol, 2,3-pentanediol, 2,4-pentanediol, etc.), a hexanediol (e.g., 1,6-hexanediol, 2-5-hexanediol, etc.), tetraethylene glycol, or a mixture thereof. In one embodiment, the aliphatic diol comprises a butanediol, a propanediol, or a mixture thereof. In one particular embodiment, the aliphatic diol comprises ethylene glycol.

In general, the regenerated composition including the regenerated diacid and catalyst and the diol may be provided. In particular, they may be provided to a vessel, such as a polymerization vessel. Initially, the regenerated diacid and the diol may undergo a reaction (e.g., esterification reaction) to form a compound including an ester bond between the diacid and the diol. In this regard, the method may include a step of reacting the regenerated diacid and the diol to form one or more compounds with an ester bond. Thereafter, to the extent necessary, a catalyst may be added as indicated herein. However, it should be understood that in certain embodiments, a catalyst may not be added. For instance, sufficient catalyst may be present within the regenerated composition such that additional catalyst may not be required. Regardless, the one or more compounds with an ester bond may then be polymerized in a polymerization reaction to form the polyester.

The regenerated diacid, diol, and catalyst may be present for the reactions in certain amounts. For instance, the regenerated diacid may be present in an amount of 10 wt. % or more, such as 15 wt. % or more, such as 20 wt. % or more, such as 25 wt. % or more, such as 30 wt. % or more, such as 35 wt. % or more, such as 40 wt. % or more, such as 45 wt. % or more, such as 50 wt. % or more, such as 60 wt. % or more, such as 70 wt. % or more, such as 75 wt. % or more based on the total weight of the monomers (i.e., regenerated diacid and diol). In addition, the regenerated diacid may be present in an amount of 90 wt. % or less, such as 85 wt. % or less, such as 80 wt. % or less, such as 75 wt. % or less, such as 70 wt. % or less, such as 65 wt. % or less, such as 60 wt. % or less, such as 50 wt. % or less, such as 40 wt. % or less based on the total weight of the monomers (i.e., regenerated diacid and diol).

Similarly, the regenerated diacid may be present in an amount of 5 mol % or more, such as 10 mol % or more, such as 15 mol % or more, such as 20 mol % or more, such as 25 mol % or more, such as 30 mol % or more, such as 35 mol % or more, such as 40 mol % or more, such as 45 mol % or more based on the total moles of the monomers (i.e., regenerated diacid and diol). The regenerated diacid may be present in an amount of 60 mol % or less, such as 55 mol % or less, such as 50 mol % or less, such as 45 mol % or less, such as 40 mol % or less, such as 35 mol % or less based on the total moles of the monomers (i.e., regenerated diacid and diol).

Furthermore, the diol may be present in an amount of 5 wt. % or more, such as 10 wt. % or more, such as 15 wt. % or more, such as 20 wt. % or more, such as 25 wt. % or more, such as 30 wt. % or more, such as 35 wt. % or more, such as 40 wt. % or more, such as 45 wt. % or more, such as 50 wt. % or more based on the total weight of the monomers (i.e., regenerated diacid and diol). In addition, the diol may be present in an amount of 80 wt. % or less, such as 75 wt. % or less, such as 70 wt. % or less, such as 65 wt. % or less, such as 60 wt. % or less, such as 50 wt. % or less, such as 40 wt. % or less, such as 35 wt. % or less, such as 30 wt. % or less based on the total weight of the monomers (i.e., regenerated diacid and diol).

Similarly, the diol may be present in an amount of 5 mol % or more, such as 10 mol % or more, such as 15 mol % or more, such as 20 mol % or more, such as 25 mol % or more, such as 30 mol % or more, such as 35 mol % or more, such as 40 mol % or more, such as 45 mol % or more, such as 50 mol % or more based on the total moles of the monomers (i.e., regenerated diacid and diol). The diol may be present in an amount of 80 mol % or less, such as 75 mol % or less, such as 60 mol % or less, such as 55 mol % or less, such as 50 mol % or less, such as 45 mol % or less, such as 40 mol % or less, such as 35 mol % or less based on the total moles of the monomers (i.e., regenerated diacid and diol).

The regenerated diacid and diol may be present in certain amounts with respect to each other. For instance, from a weight perspective, in one embodiment, the diol may be present in an amount less than the regenerated diacid. In another embodiment, the diol may be present in an amount greater than the regenerated diacid. The weight ratio of the diol to the regenerated diacid may be 0.05 or more, such as 0.1 or more, such as 0.15 or more, such as 0.2 or more, such as 0.25 or more, such as 0.3 or more, such as 0.35 or more, such as 0.4 or more, such as 0.45 or more, such as 0.5 or more. The weight ratio may be 5 or less, such as 4 or less, such as 3 or less, such as 2.5 or less, such as 2 or less, such as 1.5 or less, such as 1 or less, such as 0.9 or less, such as 0.8 or less, such as 0.7 or less, such as 0.6 or less, such as 0.55 or less, such as 0.5 or less, such as 0.45 or less.

In addition, from a mole perspective, in one embodiment, the diol may be present in an amount less than the regenerated diacid. In another embodiment, the diol may be present in an amount greater than the regenerated diacid. The molar ratio of the diol to the regenerated diacid may be 0.05 or more, such as 0.1 or more, such as 0.2 or more, such as 0.3 or more, such as 0.4 or more, such as 0.5 or more, such as 0.6 or more, such as 0.7 or more, such as 0.8 or more, such as 0.9 or more, such as 1 or more, such as 1.1 or more, such as 1.15 or more, such as 1.2 or more, such as 1.5 or more. The molar ratio may be 10 or less, such as 8 or less, such as 6 or less, such as 5 or less, such as 4 or less, such as 3 or less, such as 2.5 or less, such as 2 or less, such as 1.8 or less, such as 1.6 or less, such as 1.5 or less, such as 1.4 or less, such as 1.3 or less, such as 1.2 or less, such as 1.1 or less, such as 1 or less, such as 0.9 or less.

The total amount of catalyst that may be required for the polymerization may be 500 ppm or less, such as 450 ppm or less, such as 400 ppm or less, such as 375 ppm or less, such as 350 ppm or less, such as 325 ppm or less, such as 300 ppm or less, such as 275 ppm or less, such as 250 ppm or less, such as 225 ppm or less, such as 200 ppm or less. The total amount of catalyst that may be required for the polymerization may be more than 0 ppm, such as 10 ppm or more, such as 20 ppm or more, such as 30 ppm or more, such as 40 ppm or more, such as 50 ppm or more, such as 80 ppm or more, such as 100 ppm or more, such as 125 ppm or more, such as 150 ppm or more, such as 175 ppm or more, such as 200 ppm or more, such as 225 ppm or more, such as 250 ppm or more, such as 275 ppm or more, such as 300 ppm or more, such as 325 ppm or more, such as 350 ppm or more. The aforementioned ppm is determined based on the total amount of regenerated diacid, diol, and catalyst employed.

However, as indicated herein, the regenerated composition may already include catalyst. In this regard, the catalyst provided by the regenerated composition may be 400 ppm or less, such as 375 ppm or less, such as 350 ppm or less, such as 325 ppm or less, such as 300 ppm or less, such as 275 ppm or less, such as 250 ppm or less, such as 225 ppm or less, such as 200 ppm or less. The catalyst provided by the regenerated composition may be more than 0 ppm, such as 10 ppm or more, such as 20 ppm or more, such as 30 ppm or more, such as 40 ppm or more, such as 50 ppm or more, such as 80 ppm or more, such as 100 ppm or more, such as 125 ppm or more, such as 150 ppm or more, such as 175 ppm or more, such as 200 ppm or more, such as 225 ppm or more, such as 250 ppm or more, such as 275 ppm or more, such as 300 ppm or more, such as 325 ppm or more, such as 350 ppm or more. The aforementioned ppm is determined based on the total amount of regenerated diacid, diol, and catalyst employed.

In this regard, in one embodiment, additional catalyst may not need to be provided for the polymerization. However, in one embodiment, additional catalyst may be provided for the polymerization. Such additional catalyst may be provided prior to the polymerization. In another embodiment, such additional catalyst may be provided during polymerization. In a further embodiment, such additional catalyst may be provided prior to and during polymerization. In this regard, such amount of additional catalyst may be 400 ppm or less, such as 375 ppm or less, such as 350 ppm or less, such as 325 ppm or less, such as 300 ppm or less, such as 275 ppm or less, such as 250 ppm or less, such as 225 ppm or less, such as 200 ppm or less. The amount of additional catalyst provided may be more than 0 ppm, such as 10 ppm or more, such as 20 ppm or more, such as 30 ppm or more, such as 40 ppm or more, such as 50 ppm or more, such as 80 ppm or more, such as 100 ppm or more, such as 125 ppm or more, such as 150 ppm or more, such as 175 ppm or more, such as 200 ppm or more, such as 225 ppm or more, such as 250 ppm or more, such as 275 ppm or more, such as 300 ppm or more. The aforementioned ppm is determined based on the total amount of regenerated diacid, diol, and catalyst employed.

Accordingly, if added, the amount of catalyst added for the polymerization reaction may be 70% or less, such as 60% or less, such as 50% or less, such as 40% or less, such as 30% or less, such as 25% or less, such as 20% or less than the amount theoretically required in order to effectively undergo esterification and polymerization for formation of the polyester. Such aforementioned amount may be a weight percentage in one embodiment. In another embodiment, such aforementioned amount may be a molar percentage.

The esterification and polymerization conditions are not necessarily limited by the present invention. For instance, esterification may be conducted at a temperature of 50° C. or more, such as 70° C. or more, such as 90° C. or more, such as 100° C. or more, such as 110° C. or more, such as 130° C. or more, such as 150° C. or more, such as 180° C. or more, such as 220° C. or more, such as 240° C. or more, such as 260° C. or more. The temperature may be 400° C. or less, such as 380° C. or less, such as 350° C. or less, such as 330° C. or less, such as 310° C. or less, such as 300° C. or less, such as 280° C. or less, such as 270° C. or less, such as 260° C. or less, such as 250° C. or less, such as 220° C. or less, such as 200° C. or less, such as 180° C. or less, such as 160° C. or less, such as 150° C. or less.

The polymerization may be conducted at a temperature of 50° C. or more, such as 70° C. or more, such as 90° C. or more, such as 100° C. or more, such as 110° C. or more, such as 130° C. or more, such as 150° C. or more, such as 180° C. or more, such as 220° C. or more, such as 240° C. or more, such as 260° C. or more. The temperature may be 400° C. or less, such as 380° C. or less, such as 350° C. or less, such as 330° C. or less, such as 310° C. or less, such as 300° C. or less, such as 280° C. or less, such as 270° C. or less, such as 260° C. or less, such as 250° C. or less, such as 220° C. or less, such as 200° C. or less, such as 180° C. or less, such as 160° C. or less, such as 150° C. or less.

The esterification may be conducted at a pressure of 0.01 kPa or more, such as 0.05 kPa or more, such as 0.1 kPa or more, such as 0.2 kPa or more, such as 0.3 kPa or more, such as 0.5 kPa or more, such as 1 kPa or more, such as 2 kPa or more, such as 3 kPa or more, such as 5 kPa or more, such as 10 kPa or more, such as 20 kPa or more, such as 50 kPa or more, such as 80 kPa or more, such as 100 kPa or more, such as 130 kPa or more, such as 150 kPa or more, such as 200 kPa or more, such as 250 kPa or more, such as 300 kPa or more, such as 500 kPa or more. The pressure may be 1000 kPa or less, such as 700 kPa or less, such as 500 kPa or less, such as 400 kPa or less, such as 350 kPa or less, such as 300 kPa or less, such as 280 kPa or less, such as 250 kPa or less, such as 240 kPa or less, such as 220 kPa or less, such as 200 kPa or less, such as 170 kPa or less, such as 150 kPa or less, such as 130 kPa or less, such as 100 kPa or less, such as 70 kPa or less, such as 50 kPa or less, such as 30 kPa or less, such as 20 kPa or less, such as 10 kPa or less, such as 8 kPa or less, such as 6 kPa or less, such as 3 kPa or less, such as 1 kPa or less, such as 0.5 kPa or less.

The polymerization may be conducted at a pressure of 0.01 kPa or more, such as 0.05 kPa or more, such as 0.1 kPa or more, such as 0.2 kPa or more, such as 0.3 kPa or more, such as 0.5 kPa or more, such as 1 kPa or more, such as 2 kPa or more, such as 3 kPa or more, such as 5 kPa or more, such as 10 kPa or more, such as 20 kPa or more, such as 50 kPa or more, such as 80 kPa or more, such as 100 kPa or more, such as 130 kPa or more, such as 150 kPa or more, such as 200 kPa or more, such as 250 kPa or more, such as 300 kPa or more, such as 500 kPa or more. The pressure may be 1000 kPa or less, such as 700 kPa or less, such as 500 kPa or less, such as 400 kPa or less, such as 350 kPa or less, such as 300 kPa or less, such as 280 kPa or less, such as 250 kPa or less, such as 240 kPa or less, such as 220 kPa or less, such as 200 kPa or less, such as 170 kPa or less, such as 150 kPa or less, such as 130 kPa or less, such as 100 kPa or less, such as 70 kPa or less, such as 50 kPa or less, such as 30 kPa or less, such as 20 kPa or less, such as 10 kPa or less, such as 8 kPa or less, such as 6 kPa or less, such as 3 kPa or less, such as 1 kPa or less, such as 0.5 kPa or less. In one embodiment, upon completion of the esterification reaction, the pressure may be reduced such that the polymerization is conducted at a pressure less than the pressure of the esterification reaction.

The esterification may be conducted for 0.01 hours or more, such as 0.02 hours or more, such as 0.05 hours or more, such as 0.1 hours or more, such as 0.2 hours or more, such as 0.3 hours or more, such as 0.5 hours or more, such as 1 hour or more, such as 2 hours or more, such as 3 hours or more, such as 4 hours or more, such as 5 hours or more, such as 6 hours or more, such as 8 hours or more, such as 10 hours or more, such as 12 hours or more, such as 15 hours or more. The time may be 24 hours or less, such as 20 hours or less, such as 18 hours or less, such as 15 hours or less, such as 13 hours or less, such as 11 hours or less, such as 10 hours or less, such as 8 hours or less, such as 6 hours or less, such as 5 hours or less, such as 4 hours or less, such as 3 hours or less, such as 2 hours or less, such as 1 hour or less, such as 0.8 hours or less, such as 0.6 hours or less, such as 0.5 hours or less, such as 0.4 hours or less, such as 0.3 hours or less, such as 0.2 hours or less, such as 0.1 hours or less.

The polymerization may be conducted for 0.01 hours or more, such as 0.02 hours or more, such as 0.05 hours or more, such as 0.1 hours or more, such as 0.2 hours or more, such as 0.3 hours or more, such as 0.5 hours or more, such as 1 hour or more, such as 2 hours or more, such as 3 hours or more, such as 4 hours or more, such as 5 hours or more, such as 6 hours or more, such as 8 hours or more, such as 10 hours or more, such as 12 hours or more, such as 15 hours or more. The time may be 24 hours or less, such as 20 hours or less, such as 18 hours or less, such as 15 hours or less, such as 13 hours or less, such as 11 hours or less, such as 10 hours or less, such as 8 hours or less, such as 6 hours or less, such as 5 hours or less, such as 4 hours or less, such as 3 hours or less, such as 2 hours or less, such as 1 hour or less, such as 0.8 hours or less, such as 0.6 hours or less, such as 0.5 hours or less, such as 0.4 hours or less, such as 0.3 hours or less, such as 0.2 hours or less, such as 0.1 hours or less.

The polyester may have certain properties and may also be substantially similar with respect to certain properties when compared to a standard polyester. For instance, when measured at 25° C., the polyester may have an intrinsic viscosity of 1.0 dL/g or less, such as 0.95 dL/g or less, such as 0.90 dL/g or less, such as 0.85 dL/g or less, such as 0.80 dL/g or less, such as 0.75 dL/g or less, such as 0.70 dL/g or less, such as 0.65 dL/g or less, such as 0.60 dL/g or less. The intrinsic viscosity may be 0.30 dL/g or more, such as 0.35 dL/g or more, such as 0.40 dL/g or more, such as 0.45 dL/g or more, such as 0.50 dL/g or more, such as 0.55 dL/g or more, such as 0.60 dL/g or more, such as 0.65 dL/g or more, such as 0.70 dL/g or more. In general, the ratio of the intrinsic viscosity of the polyester formed from a regenerated composition including a regenerated diol to the intrinsic viscosity of a standard polyester formed according to the same conditions except utilizing a virgin or unregenerated diacid may be 1.2 or less, such as 1.15 or less, such as 1.1 or less, such as 1.05 or less, such as 1 or less, such as 0.98 or less, such as 0.95 or less, such as 0.93 or less, such as 0.9 or less. The ratio may be 0.8 or more, such as 0.84 or more, such as 0.85 or more, such as 0.88 or more, such as 0.9 or more, such as 0.93 or more, such as 0.95 or more, such as 0.98 or more. The intrinsic viscosity may be determined using means known in the art, such as in accordance with ASTM D4603-13.

In addition, the polyester may have a certain melting temperature. For instance, the melting temperature may be 200° C. or more, such as 220° C. or more, such as 230° C. or more, such as 240° C. or more, such as 245° C. or more, such as 250° C. or more, such as 252° C. or more, such as 255° C. or more, such as 258° C. or more. The melting temperature may be 300° C. or less, such as 290° C. or less, such as 280° C. or less, such as 275° C. or less, such as 260° C. or less, such as 258° C. or less, such as 255° C. or less, such as 253° C. or less, such as 250° C. or less. The ratio of the melting temperature of the polyester formed from a regenerated composition including a regenerated diol to the melting temperature of a standard polyester formed according to the same conditions except utilizing a virgin or unregenerated diacid may be 1.2 or less, such as 1.15 or less, such as 1.1 or less, such as 1.05 or less, such as 1.01 or less, such as 1 or less, such as 0.98 or less, such as 0.95 or less. The ratio may be 0.8 or more, such as 0.85 or more, such as 0.88 or more, such as 0.9 or more, such as 0.93 or more, such as 0.95 or more, such as 0.96 or more, such as 0.97 or more, such as 0.98 or more, such as 0.99 or more. The melting temperature may be determined using means known in the art, such as in accordance with ASTM D7138-16.

Furthermore, the polyester may have a certain ash content. For instance, the ash content may be 0.5% or less, such as 0.45% or less, such as 0.4% or less, such as 0.35% or less, such as 0.3% or less, such as 0.25% or less, such as 0.2% or less, such as 0.15% or less, such as 0.1% or less, such as 0.08% or less, such as 0.06% or less, such as 0.05% or less, such as 0.04% or less. The ash content may be 0% or more, such as 0.01% or more, such as 0.02% or more, such as 0.03% or more, such as 0.04% or more, such as 0.05% or more, such as 0.1% or more, such as 0.15% or more, such as 0.2% or more, such as 0.25% or more. The ratio of the ash content of the polyester formed from a regenerated composition including a regenerated diol to the ash content of a standard polyester formed according to the same conditions except utilizing a virgin or unregenerated diacid may be 1.2 or less, such as 1.1 or less, such as 1 or less, such as 0.9 or less, such as 0.8 or less, such as 0.7 or less, such as 0.6 or less, such as 0.5 or less, such as 0.45 or less, such as 0.4 or less, such as 0.3 or less, such as 0.25 or less, such as 0.2 or less, such as 0.18 or less, such as 0.15 or less, such as 0.13 or less, such as 0.1 or less. The ratio may be more than 0, such as 0.05 or more, such as 0.1 or more, such as 0.2 or more, such as 0.3 or more, such as 0.4 or more, such as 0.5 or more, such as 0.6 or more, such as 0.7 or more, such as 0.8 or more, such as 0.9 or more. The ash content may be determined in accordance with ASTM D5630-13.

As indicated above, the polyester is formed from polymerization of a regenerated composition including a regenerated diacid and a catalyst. In this regard, such regenerated composition is formed by depolymerizing a polyester in a waste material. Accordingly, such polyester employed in such depolymerization may be any of the polyesters as mentioned above. Furthermore, without intending to be limited, the waste material may include a variety of materials. For instance, the source of the waste material may be a used material or a recycled material. For instance, the waste material may be a pre-consumer source, such as a scrap created as a by-product or a post-consumer source, such as a used material. The waste material may be in the form of a textile, a fiber, a yarn, a film, a chip, etc. For instance, the waste material may be a textile including a fiber and/or a yarn. In this regard, the waste material may be a waste textile. Furthermore, the polyester may be present in various forms. For instance, the polyester may be present in the form of a fiber, a yarn, a film, a chip, etc. In one embodiment, the polyester may be present in the form of a film or a chip. In another embodiment, the polyester may be present in the form of a fiber or a yarn. For instance, the polyester may be present in the form of a fiber. In another embodiment, the polyester may be present in the form of a yarn. Accordingly the feedstock for the polyester or waste material is not necessarily limited by the present invention.

When present as a waste material such as a waste textile, the polyester may be present alone or in the presence of other polymers. In this regard, the polyester may be a part of a starting waste material, such as a waste textile, including a polyester and at least one other polymer. In one embodiment, the at least one other polymer may be a polymer other than a polyester. The at least one other polymer may include, but is not limited to, a cellulose, a polyamide, a polyetherpolyurea copolymer, a polyurethane, a lignocellulosic, a siloxane, a natural polymeric fiber, or a combination thereof. In one embodiment, the at least one other polymer comprises a polyamide. For instance, the polyamide may be nylon. In addition, the polyamide may specifically be a polypeptide.

Furthermore, the polymer may include a natural polymeric fiber, such as keratin, chitin, chitosan, collagen, or a mixture thereof. In another embodiment, the at least one other polymer comprises a polyether-polyurea copolymer. For instance, the polyether-polyurea copolymer may be spandex (e.g., elastane). In a further embodiment, the at least one other polymer includes cellulose. The cellulose may include, but is not limited to, rayon, cotton, viscose, lyocell, cellulose acetate, etc. In addition, in one embodiment, the cellulose may be a regenerated cellulose.

In general, when at least one other polymer is present in the depolymerization with the polyester, the polyester is present in an amount of 0.01 wt. % or more, such as 1 wt. % or more, such as 2 wt. % or more, such as 5 wt. % or more, such as 10 wt. % or more, such as 15 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more, such as 85 wt. % or more, such as 90 wt. % or more, such as 95 wt. % or more, such as 98 wt. % or more, such as 99 wt. % or more, such as 100 wt. % based on the total weight of the polymers (i.e., polyester and at least one other polymer). The polyester may be present in an amount of 100 wt. % or less, such as 99.9 wt. % or less, such as 99 wt. % or less, such as 98 wt. % or less, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 5 wt. % or less based on the total weight of the polymers (i.e., polyester and at least one other polymer).

Furthermore, when at least one other polymer is present with the polyester, the at least one other polymer is present in an amount of 0.01 wt. % or more, such as 1 wt. % or more, such as 2 wt. % or more, such as 5 wt. % or more, such as 10 wt. % or more, such as 15 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more, such as 85 wt. % or more, such as 90 wt. % or more, such as 95 wt. % or more, such as 98 wt. % or more, such as 99 wt. % or more, such as 100 wt. % based on the total weight of the polymers (i.e., polyester and at least one other polymer(s)). The at least one other polymer may be present in an amount of 100 wt. % or less, such as 99.9 wt. % or less, such as 99 wt. % or less, such as 98 wt. % or less, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 5 wt. % or less based on the total weight of the polymers (i.e., polyester and at least one other polymer(s)). Such aforementioned weight percentages may be with respect to a single one other polymer or a plurality of other polymers other than a polyester.

In general, the depolymerization of the polyester in the waste material results in the formation of a regenerated composition including the regenerated diacid (i.e., dicarboxylic acid) and catalyst as well as a regenerated diol. Furthermore, the regenerated composition may also include a regenerated diol. The nature of the regenerated diol and the regenerated diacid may be dependent upon the particular polyester that is subject to depolymerization. Furthermore, the depolymerization method may allow for formation of the regenerated diacid as, without intending to be limited by theory, the method may prevent the decarboxylation of the regenerated diacid.

For instance, the regenerated diacid may include, but is not limited to, a saturated diacid, an unsaturated diacid, or a mixture thereof. In one embodiment, regenerated diacid comprises a saturated diacid. The saturated diacid comprises ethanedioic acid, propanedioic acid, butanedioic acid, pentanedioic acid, hexanedioic acid, heptanedioic acid, octanedioic acid, nonanedioic acid, decanedioic acid, or a mixture thereof.

In one embodiment, the regenerated diacid comprises an unsaturated diacid. For instance, the unsaturated diacid comprises a linear unsaturated diacid, a branched unsaturated diacid, an aromatic diacid, or a mixture thereof. In one embodiment, the unsaturated diacid comprises a linear unsaturated diacid. In another embodiment, the unsaturated diacid comprises a branched unsaturated diacid. In a further embodiment, the unsaturated diacid comprises an aromatic diacid. The aromatic diacid may be polycyclic. For instance, the polycyclic aromatic diacid may include a fused, a bridged, or a spiro aromatic diacid.

For instance, the unsaturated diacid may comprise maleic acid, fumaric acid, glutaconic acid, or a mixture thereof. In one particular embodiment, the aromatic diacid may comprise terephthalic acid, phthalic acid, isophthalic acid, napthalenedicarboxylic acid, or a mixture thereof. In one embodiment, the aromatic diacid may comprise phthalic acid, isophthalic acid, napthalenedicarboxylic acid, or a mixture thereof. In one particular embodiment, the aromatic diacid may comprise terephthalic acid.

As indicated herein, the regenerated composition also comprises a catalyst. Because of the method utilized herein, the catalyst may maintain its catalytic activity. The catalyst may include antimony, germanium, titanium, cobalt, molybdenum, or a mixture thereof. In one embodiment, the catalyst may include germanium, titanium, cobalt, molybdenum, or a mixture thereof. In one particular embodiment, the catalyst may include antimony. For instance, the antimony may comprise antimony trioxide, antimony acetate (e.g., antimony triacetate aka antimony(III) acetate), antimony glycolate, an antimony/metal composite, or a mixture thereof. For instance, the antimony/metal composite may comprise antimony and a transition metal and/or an alkali metal. In one embodiment, the antimony/metal composite may comprise both a transition metal and an alkali metal. The transition metal may comprise, but is not limited to, cobalt, manganese, zinc, or a mixture thereof. The alkali metal may comprise lithium, sodium, potassium, cesium, or a mixture thereof. In one embodiment, the antimony catalyst may comprise antimony acetate (e.g., antimony triacetate), antimony glycolate, an antimony/metal composite, or a mixture thereof. In one particular embodiment, the antimony may comprise antimony trioxide. In another particular embodiment, the antimony may comprise an antimony acetate, such as antimony triacetate.

The regenerated composition may include a certain amount of the catalyst. In general, such catalyst may be present in the regenerated composition after the depolymerization of the polyester as indicated above. The catalyst may be present in the regenerated composition an amount of greater than 0 ppm, such as 5 ppm or greater, such as 10 ppm or greater, such as 15 ppm or greater, such as 20 ppm or greater, such as 25 ppm or greater, such as 30 ppm or greater, such as 40 ppm or greater, such as 50 ppm or greater, such as 60 ppm or greater, such as 70 ppm or greater, such as 75 ppm or greater, such as 90 ppm or greater, such as 100 ppm or greater, such as 125 ppm or greater, such as 150 ppm or greater, such as 180 ppm or greater, such as 200 ppm or greater. The catalyst may be present in the regenerated composition in an amount of 350 ppm or less, such as 300 ppm or less, such as 275 ppm or less, such as 250 ppm or less, such as 225 ppm or less, such as 200 ppm or less, such as 190 ppm or less, such as 170 ppm or less, such as 150 ppm or less, such as 130 ppm or less, such as 110 ppm or less, such as 100 ppm or less, such as 90 ppm or less.

In other words, the catalyst may be present in an amount of greater than 0 wt. %, such as 0.0005 wt. % or greater, such as 0.001 wt. % or greater, such as 0.002 wt. % or greater, such as 0.003 wt. % or greater, such as 0.004 wt. % or greater, such as 0.005 wt. % or greater, such as 0.006 wt. % or greater, such as 0.007 wt. % or greater, such as 0.0075 wt. % or greater, such as 0.008 wt. % or greater, such as 0.01 wt. % or greater, such as 0.012 wt. % or greater, such as 0.014 wt. % or greater, such as 0.015 wt. % or greater, such as 0.018 wt. % or greater, such as 0.02 wt. % or greater, such as 0.022 wt. % or greater, such as 0.025 wt. % or greater, such as 0.028 wt. % or greater, such as 0.03 wt. % or greater, such as 0.04 wt. % or greater based on the weight of the regenerated diacid. The catalyst may be present in an amount of 0.05 wt. % or less, such as 0.048 wt. % or less, such as 0.045 wt. % or less, such as 0.043 wt. % or less, such as 0.04 wt. % or less, such as 0.037 wt. % or less, such as 0.035 wt. % or less, such as 0.033 wt. % or less, such as 0.03 wt. % or less, such as 0.028 wt. % or less, such as 0.025 wt. % or less, such as 0.022 wt. % or less, such as 0.02 wt. % or less, such as 0.018 wt. % or less, such as 0.016 wt. % or less, such as 0.015 wt. % or less, such as 0.013 wt. % or less, such as 0.011 wt. % or less, such as 0.01 wt. % or less, such as 0.009 wt. % or less, such as 0.008 wt. % or less, such as 0.007 wt. % or less, such as 0.005 wt. % or less, such as 0.003 wt. % or less, such as 0.002 wt. % or less, such as 0.001 wt. % or less based on the weight of the regenerated diacid.

The regenerated diacid may be present in an amount of 80 wt. % or more, such as 85 wt. % or more, such as 90 wt. % or more, such as 95 wt. % or more, such as 97 wt. % or more, such as 98 wt. % or more, such as 99 wt. % or more, such as 99.5 wt. % or more, such as 99.7 wt. % or more, such as 99.8 wt. % or more, such as 99.9 wt. % or more, such as 99.95 wt. % or more, such as 99.96 wt. % or more, such as 99.97 wt. % or more, such as 99.98 wt. % or more, such as 99.99 wt. % or more. The regenerated diacid may be present in an amount of less than 100 wt. %, such as 99.99999 wt. % or less, such as 99.9999 wt. % or less, such as 99.9995 wt. % or less, such as 99.999 wt. % or less, such as 99.995 wt. % or less, such as 99.9 wt. % or less.

As indicated above, the depolymerization may also result in a regenerated diol. For instance, the regenerated diol may be, but is not limited to, an aliphatic diol, an aromatic diol, or a mixture thereof. In one embodiment, the regenerated diol may comprise an aromatic diol. The aromatic diol may be polycyclic. For instance, the polycyclic aromatic diol may include a fused, a bridged, or a spiro aromatic diol. The aromatic diol may comprise catechol, resorcinol, hydroquinone, or a mixture thereof. In another embodiment, the regenerated diol comprises an aliphatic diol. For instance, the aliphatic diol may comprise ethylene glycol, a butanediol (e.g., 1,2-butanediol, 1,3-butanediol, 1,4-butanediol, 2,3-butanediol), a propanediol (e.g., 1,2-propanediol, 1,3-propanediol), a pentanediol (e.g., 1,5-pentanediol, 2,3-pentanediol, 2,4-pentanediol, etc.), a hexanediol (e.g., 1,6-hexanediol, 2-5-hexanediol, etc.), tetraethylene glycol, or a mixture thereof. In one embodiment, the aliphatic diol comprises a butanediol, a propanediol, or a mixture thereof. In one particular embodiment, the aliphatic diol comprises ethylene glycol.

While the aforementioned provides a general description regarding the depolymerization process, the below provides further details. In general, the apparatus for conducting the depolymerization is not necessarily limited. For instance, the depolymerization may be conducted in a depolymerization vessel, which may also be interchangeably referred to as a reactor. In particular, the vessel may be one that allows for depolymerization under hydrothermal conditions. Regardless of the apparatus, the depolymerization may be conducted in a continuous process, batch process, or semi-continuous process. In one embodiment, the depolymerization may be conducted in a continuous process. In another embodiment, the depolymerization may be conducted in a batch process. In a further embodiment, the depolymerization may be conducted in a semi-continuous process.

Depolymerization may be conducted using various methods that allow for breaking down the ester bond. For instance, in one embodiment, the depolymerization may be conducted via alcoholysis, such as by using a monohydric or polyhydric alcohol. One example of alcoholysis may be methanolysis. In a particular embodiment, the depolymerization may be conducted via hydrolysis. With respect to the latter, an alcohol, such as methanol, may not be provided during depolymerization to degrade or break down the polyester.

In general, the vessel may include a depolymerization mixture. For instance, the depolymerization mixture may include the waste textile. In addition, the depolymerization mixture may also include a liquid phase. The liquid phase may include water, a diol, or a mixture thereof. In one embodiment, the liquid phase may include water. In another embodiment, the liquid phase may include a diol, such as the examples of the regenerated diols mentioned above such as ethylene glycol. When the liquid phase includes water, the water may be present in an amount of 50 wt. % or more, such as 60 wt. % or more, such as 70 wt. % or more, such as 80 wt. % or more, such as 90 wt. % or more, such as 95 wt. % or more, such as 98 wt. % or more, such as 99 wt. % or more of the liquid phase. In one embodiment, the entire liquid phase (i.e., 100 wt. %) may include water.

The solids content may be 0.01 wt. % or more, such as 1 wt. % or more, such as 2 wt. % or more, such as 5 wt. % or more, such as 10 wt. % or more, such as 15 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more, such as 85 wt. % or more, such as 90 wt. % or more, such as 95 wt. % or more, such as 98 wt. % or more, such as 99 wt. % or more based on the total weight of the solids and liquid (i.e., the depolymerization mixture). The solids content may be less than 100 wt. %, such as 99.9 wt. % or less, such as 99 wt. % or less, such as 98 wt. % or less, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 5 wt. % or less based on the total weight of the solids and liquid (i.e., the depolymerization mixture).

Of the solids, the waste material, such as the waste textile, may be present in an amount of 0.01 wt. % or more, such as 1 wt. % or more, such as 2 wt. % or more, such as 5 wt. % or more, such as 10 wt. % or more, such as 15 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more, such as 85 wt. % or more, such as 90 wt. % or more, such as 95 wt. % or more, such as 98 wt. % or more, such as 99 wt. % or more, such as 100 wt. % based on the total weight of the solids. The waste material may be present in an amount of 100 wt. % or less, such as 99.9 wt. % or less, such as 99 wt. % or less, such as 98 wt. % or less, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 5 wt. % or less based on the total weight of the solids.

The depolymerization may be conducted under alkaline conditions. For instance, the pH may be greater than 7, such as 7.5 or greater, than 8 or greater, such as 8.5 or greater, such as 9 or greater, such as 9.5 or greater, such as 10 or greater, such as 11 or greater, such as 12 or greater. The pH may be 14 or less, such as 13 or less, such as 12.5 or less, such as 12 or less, such as 11.5 or less, such as 11 or less, such as 10.5 or less, such as 10 or less, such as 9.5 or less, such as 9 or less. For instance, as one example, the pH may be from 12 to 13.

In other to obtain an alkaline pH, a base may be provided to the mixture. The base may be a weak base or a strong base. In one embodiment, the base may be a weak base. For instance, the base may include, but is not limited to, ammonia, methylamine, trimethylamine, hydrazine, ammonium hydroxide, etc. In another embodiment, the base may be a strong base. For instance, the base may include, but is not limited to, potassium hydroxide, sodium hydroxide, barium hydroxide, calcium hydroxide, lithium hydroxide, magnesium hydroxide, etc. Accordingly, the base may be an alkali metal hydroxide, an alkaline earth metal hydroxide, an ammonium hydroxide, or a mixture thereof. When utilized, the base may be present in an amount of 0.01 wt. % or more, such as 0.05 wt. % or more, such as 0.1 wt. % or more, such as 0.2 wt. % or more, such as 0.3 wt. % or more, such as 0.5 wt. % or more, such as 1 wt. % or more, such as 2 wt. % or more, such as 3 wt. % or more, such as 5 wt. % or more, such as 7 wt. % or more, such as 10 wt. % or more, such as 12 wt. % or more, such as 14 wt. % or more of the depolymerization mixture. The base may be present in an amount of 15 wt. % or less, such as 13 wt. % or less, such as 11 wt. % or less, such as 10 wt. % or less, such as 8 wt. % or less, such as 6 wt. % or less, such as 5 wt. % or less, such as 4 wt. % or less, such as 3 wt. % or less, such as 2 wt. % or less, such as 1 wt. % or less, such as 0.8 wt. % or less, such as 0.5 wt. % or less of the depolymerization mixture.

Furthermore, the remaining depolymerization conditions are not necessarily limited. For instance, depolymerization may be conducted at a temperature of 50° C. or more, such as 60° C. or more, such as 70° C. or more, such as 80° C. or more, such as 90° C. or more, such as 100° C. or more, such as 110° C. or more, such as 120° C. or more, such as 130° C. or more, such as 150° C. or more, such as 180° C. or more. The temperature may be 250° C. or less, such as 240° C. or less, such as 220° C. or less, such as 200° C. or less, such as 190° C. or less, such as 180° C. or less, such as 170° C. or less, such as 160° C. or less, such as 150° C. or less, such as 140° C. or less. In particular, the depolymerization may be conducted at a temperature between atmospheric boiling point (100° C.) and the critical temperature of water (374° C.).

The depolymerization may be conducted at a pressure of 1 kPa or more, such as 2 kPa or more, such as 3 kPa or more, such as 5 kPa or more, such as 10 kPa or more, such as 20 kPa or more, such as 50 kPa or more, such as 80 kPa or more, such as 100 kPa or more, such as 130 kPa or more, such as 150 kPa or more, such as 200 kPa or more, such as 250 kPa or more, such as 300 kPa or more, such as 500 kPa or more, such as 800 kPa or more, such as 1000 kPa or more, such as 1200 kPa or more, such as 1500 kPa or more. The pressure may be 2000 kPa or less, such as 1800 kPa or less, such as 1500 kPa or less, such as 1300 kPa or less, such as 1000 kPa or less, such as 700 kPa or less, such as 500 kPa or less, such as 400 kPa or less, such as 300 kPa or less, such as 200 kPa or less, such as 100 kPa or less, such as 70 kPa or less, such as 50 kPa or less, such as 40 kPa or less, such as 30 kPa or less, such as 25 kPa or less, such as 20 kPa or less, such as 15 kPa or less, such as 10 kPa or less. Furthermore, the pressure may be the vapor pressure of water.

The depolymerization may be conducted for 0.01 hours or more, such as 0.02 hours or more, such as 0.05 hours or more, such as 0.1 hours or more, such as 0.2 hours or more, such as 0.3 hours or more, such as 0.5 hours or more, such as 1 hour or more, such as 2 hours or more, such as 3 hours or more, such as 4 hours or more, such as 5 hours or more, such as 6 hours or more, such as 8 hours or more, such as 10 hours or more, such as 12 hours or more, such as 15 hours or more. The time may be 24 hours or less, such as 20 hours or less, such as 18 hours or less, such as 15 hours or less, such as 13 hours or less, such as 11 hours or less, such as 10 hours or less, such as 8 hours or less, such as 6 hours or less, such as 5 hours or less, such as 4 hours or less, such as 3 hours or less, such as 2 hours or less, such as 1 hour or less, such as 0.8 hours or less, such as 0.6 hours or less, such as 0.5 hours or less, such as 0.4 hours or less, such as 0.3 hours or less, such as 0.2 hours or less, such as 0.1 hours or less.

Upon depolymerization, the depolymerized mixture may include the regenerated diol and the regenerated diacid, such as a salt of the regenerated diacid. For instance, the regenerated diacid, such as a salt of a regenerated diacid, may be dissolved in the liquid media. The salt may be an alkali metal salt or an alkaline earth metal salt. In one embodiment, the salt may be an alkali metal salt, such as a dialkali metal salt. For instance, the salt may comprise lithium, sodium, potassium, cesium, or a mixture thereof. In one embodiment, the salt may comprise dilithium, disodium, dipotassium, dicesium, or a mixture thereof. In another embodiment, the sale may comprise an alkaline metal salt. For instance, the salt may comprise beryllium, magnesium, calcium, strontium, barium, or a mixture thereof.

The depolymerized mixture may also include the catalyst as described herein. Furthermore, the regenerated diacid, the regenerated diol, and/or the catalyst may be present in the depolymerized mixture as dissolved constituents. For instance, in one embodiment, the regenerated diacid may be dissolved. In another embodiment, the regenerated diol may be dissolved. In a further embodiment, the catalyst may be dissolved.

As indicated herein, the waste material may include other polymers in addition to the polyester. In this regard, such polymers may not be depolymerized during the depolymerization reaction. Accordingly, such polymers may also be present in the depolymerized mixture. As a result, upon completion of the depolymerization, such polymers may be removed or separated from the depolymerized mixture. Such removal or separation may be via mechanical means, such as a filter. However, it should be understood that other means as generally known in the art may also be utilized to separate the other polymers from the depolymerized mixture. The temperature is not necessarily limited and may be room temperature or greater. For instance, the temperature may be 20° C. or more, such as 30° C. or more, such as 40° C. or more, such as 50° C. or more, such as 60° C. or more, such as 70° C. or more, such as 80° C. or more, such as 90° C. or more, such as 100° C. or more, such as 110° C. or more, such as 120° C. or more, such as 130° C. or more, such as 150° C. or more, such as 180° C. or more. The temperature may be 250° C. or less, such as 240° C. or less, such as 220° C. or less, such as 200° C. or less, such as 190° C. or less, such as 180° C. or less, such as 170° C. or less, such as 160° C. or less, such as 150° C. or less, such as 140° C. or less.

The depolymerized mixture, in particular the depolymerized and separated mixture, may also be clarified. For instance, the mixture may be clarified using means generally known in the art, such as filtration (e.g., membrane filtration), centrifugation, etc. In particular, the filtration may be a diatomaceous earth filtration. Such step may allow for a reduction or removal of solids within the mixture.

In addition or alternatively, the mixture may undergo a decolorization step using a decolorization agent. For instance, the mixture may be subjected to a decolorization agent comprising a decolorizing carbon, such as activated charcoal. Other decolorization agents that may assist with decolorization may include a peroxide (e.g., hydrogen peroxide, sodium peroxide, etc.), a hypochlorite (e.g., sodium hypochlorite, calcium hypochlorite, lithium hypochlorite, etc.), carbonates (e.g., sodium carbonate), peracetic acid, sodium chloride, sodium hydrosulfite, etc.

The depolymerized mixture (e.g., with or without the aforementioned separation, clarification, and/or decolorization) may then be subjected to an isolation step, such as a precipitation step. Regarding isolation, such processes may include distillation, etc. In one particular embodiment, the isolation may be a precipitation (or crystallization) step. For instance, the precipitation step can allow for precipitation of the regenerated diacid. Similarly, the precipitation step may also allow for precipitation of the catalyst. In order to begin the precipitation, an acid may be provided to the depolymerized mixture. The acid may be a weak acid or a strong acid. In one embodiment, the acid may be a weak acid. For instance, the acid may be, but is not limited to, acetic acid, formic acid, benzoic acid, oxalic acid, hydrofluoric acid, phosphoric acid, nitrous acid, etc. In another embodiment, the acid may be a strong acid. For instance, the acid may be, but is not limited to, hydrochloric acid, nitric acid, sulfuric acid, hydrobromic acid, hydroiodic acid, chloric acid, perchloride acid, etc. The concentration of the acid is not necessarily limited by the present invention. For instance, the concentration may be 1% or more, such as 5% or more, such as 10% or more, such as 15% or more, such as 20% or more, such as 25% or more, such as 30% or more, such as 40% or more, such as 50% or more, such as 60% or more, such as 70% or more, such as 80% or more, such as 90% or more, such as 100%. The concentration may be 100% or less, such as 95% or less, such as 90% or less, such as 80% or less, such as 70% or less, such as 60% or less, such as 50% or less, such as 40% or less, such as 30% or less, such as 25% or less, such as 20% or less, such as 15% or less, such as 10% or less, such as 5% or less.

In this regard, the pH of the depolymerized mixture may be reduced in order for the precipitation to be initiated and/or occur. For instance, the pH may be 7 or less, such as 6.5 or less, such as 6 or less, such as 5.5 or less, such as 5 or less, such as 4.5 or less, such as 4 or less, such as 3.5 or less, such as 3 or less, such as 2.5 or less. The pH may be 1 or more, such as 1.5 or more, such as 2 or more, such as 2.5 or more, such as 3 or more, such as 3.5 or more, such as 4 or more, such as 4.5 or more, such as 5 or more, such as 5.5 or more. In this regard, the final pH during the precipitation may be within the aforementioned pH range.

In addition, the residence time allowing for the regenerated diacid and/or catalyst to undergo precipitation may be 0.5 minutes or more, such as 1 minute or more, such as 2 minutes or more, such as 3 minutes or more, such as 5 minutes or more, such as 10 minutes or more, such as 15 minutes or more, such as 20 minutes or more, such as 25 minutes or more, such as 30 minutes or more, such as 45 minutes or more, such as 1 hour or more. The residence time allowing for the regenerated diacid and/or catalyst to undergo precipitation may be 10 hours or less, such as 8 hours or less, such as 6 hours or less, such as 5 hours or less, such as 4 hours or less, such as 3 hours or less, such as 2 hours or less, such as 1 hour or less, such as 50 minutes or less, such as 40 minutes or less, such as 30 minutes or less, such as 25 minutes or less, such as 20 minutes or less, such as 15 minutes or less, such as 10 minutes or less, such as 8 minutes or less, such as 6 minutes or less, such as 5 minutes or less, such as 4 minutes or less, such as 3 minutes or less, such as 2 minutes or less.

In one embodiment, the reduction in pH may be gradual allowing for a more controlled precipitation. In this regard, the precipitation may be conducted during at least two intervals, each at a different pH.

For instance, the pH may be reduced to within the aforementioned range and held for a certain period of time prior to a further reduction. For instance, the initial reduction in pH may be 0.5 or more, such as 1 or more, such as 1.5 or more, such as 2 or more, such as 2.5 or more, such as 3 or more. The initial reduction in pH may be 5 or less, such as 4.5 or less, such as 4 or less, such as 3.5 or less, such as 3 or less, such as 2.5 or less. Upon completing the initial reduction, the regenerated diacid may be allowed to undergo precipitation for 0.5 minutes or more, such as 1 minute or more, such as 2 minutes or more, such as 3 minutes or more, such as 5 minutes or more, such as 10 minutes or more, such as 15 minutes or more, such as 20 minutes or more, such as 25 minutes or more, such as 30 minutes or more, such as 45 minutes or more, such as 1 hour or more. The regenerated diacid may be allowed to undergo precipitation for 10 hours or less, such as 8 hours or less, such as 6 hours or less, such as 5 hours or less, such as 4 hours or less, such as 3 hours or less, such as 2 hours or less, such as 1 hour or less, such as 50 minutes or less, such as 40 minutes or less, such as 30 minutes or less, such as 25 minutes or less, such as 20 minutes or less, such as 15 minutes or less, such as 10 minutes or less, such as 8 minutes or less, such as 6 minutes or less, such as 5 minutes or less, such as 4 minutes or less, such as 3 minutes or less, such as 2 minutes or less.

Thereafter, the pH may be further reduced in a second pH reduction step. Such reduction in pH may be 5 or less, such as 4.5 or less, such as 4 or less, such as 3.5 or less, such as 3 or less, such as 2.5 or less. Upon completing the initial reduction, the regenerated diacid may be allowed to undergo precipitation for 0.5 minutes or more, such as 1 minute or more, such as 2 minutes or more, such as 3 minutes or more, such as 5 minutes or more, such as 10 minutes or more, such as 15 minutes or more, such as 20 minutes or more, such as 25 minutes or more, such as 30 minutes or more, such as 45 minutes or more, such as 1 hour or more. The regenerated diacid may be allowed to undergo precipitation for 10 hours or less, such as 8 hours or less, such as 6 hours or less, such as 5 hours or less, such as 4 hours or less, such as 3 hours or less, such as 2 hours or less, such as 1 hour or less, such as 50 minutes or less, such as 40 minutes or less, such as 30 minutes or less, such as 25 minutes or less, such as 20 minutes or less, such as 15 minutes or less, such as 10 minutes or less, such as 8 minutes or less, such as 6 minutes or less, such as 5 minutes or less, such as 4 minutes or less, such as 3 minutes or less, such as 2 minutes or less.

While the aforementioned mentions two pH reduction steps, it should be understood that the number of pH reduction steps and the degree of each pH reduction may not necessarily be limited by the present invention. For instance, the process may also include a third pH reduction step with a reduction and time of reduction as indicated above with respect to the first and second reduction steps.

Once the regenerated diacid and/or catalyst have precipitated, the regenerated composition including the regenerated diacid and catalyst may be separated from the precipitated mixture, which may include the regenerated diol and/or the liquid media. Such separation may be using mechanical means. For instance, the separation may be conducted using means generally known in the art, such as filtration (e.g., filter press), centrifugation, decanting, etc. Thereafter, the regenerated composition including the regenerated diacid and the catalyst may be washed and allowed to dry under ambient conditions or in a heating apparatus.

Furthermore, the regenerated composition including the regenerated diacid and catalyst may be aged in order to obtain a desired crystal size. For instance, initially, the average crystal size of the regenerated diacid may be less than 25 microns, such as 23 microns or less, such as 20 microns or less, such as 18 microns or less, such as 15 microns or less, such as 13 microns or less, such as 10 microns or less. After undergoing the aging and method as disclosed herein, the average crystal size may be 50 microns or more, such as 60 microns or more, such as 70 microns or more, such as 75 microns or more, such as 80 microns or more, such as 85 microns or more, such as 90 microns or more, such as 93 microns or more, such as 95 microns or more, such as 98 microns or more, such as 100 microns or more. The average crystal size may be 200 microns or less, such as 190 microns or less, such as 180 microns or less, such as 170 microns or less, such as 160 microns or less, such as 150 microns or less, such as 140 microns or less, such as 130 microns or less, such as 125 microns or less, such as 120 microns or less, such as 115 microns or less, such as 110 microns or less, such as 108 microns or less, such as 105 microns or less, such as 103 microns or less, such as 100 microns or less. Furthermore, in one embodiment, the size distribution may be a unimodal size distribution. In general, the crystal size may be determined using means known in the art, such as laser light scattering.

The purity of the regenerated diacid may also be improved. In this regard, the regenerated diacid may have a purity of 80% or more, such as 85% or more, such as 90% or more, such as 93% or more, such as 95% or more, such as 97% or more, such as 98% or more, such as 99% or more. The purity may be determined using means generally known in the art.

Once separated from the regenerated diol, the regenerated composition may be washed and/or filtered until a generally neutral pH is obtained. However, it should be understood that the regenerated diacid and catalyst may be aged in order to obtain a desired crystal size without any washing and/or filtration.

The aging may be conducted at a desired pH. For instance, the pH may be 6 or more, such as 6.1 or more, such as 6.2 or more, such as 6.3 or more, such as 6.4 or more, such as 6.5 or more, such as 6.6. or more, such as 6.7 or more, such as 6.8 or more, such as 6.9 or more, such as 7 or more. The pH may be 8.0 or less, such as 7.9 or less, such as 7.8 or less, such as 7.7 or less, such as 7.6 or less, such as 7.5 or less, such as 7.4 or less, such as 7.3 or less, such as 7.2 or less, such as 7.1 or less, such as 7 or less.

In addition, the aging is conducted in liquid media. For instance, the liquid media may be any of those as discussed above with regard to the liquid media utilized in the depolymerization. The liquid media may include water, an organic solvent, or a mixture thereof. In one particular embodiment, the liquid media may be water. In another embodiment, the liquid media may be an organic solvent. For instance, the organic solvent may include, but is not limited to, acetic acid, dimethylformamide, and/or dimethyl sulfoxide. In one particular embodiment, the solvent may include an organic solvent including acetic acid. In one embodiment, the liquid media may include a combination of acetic acid and water.

Furthermore, the solids content within the liquid media may be 5 wt. % or more, such as 10 wt. % or more, such as 15 wt. % or more, such as 20 wt. % or more, such as 25 wt. % or more. The solids content may be 50 wt. % or less, such as 45 wt. % or less, such as 35 wt. % or less, such as 30 wt. %' or less, such as 25 wt. % or less, such as 20 wt. % or less, such as 15 wt. % or less. The final solids content after aging and drying of the regenerated composition including the regenerated diacid and catalyst may be 90 wt. % or more, such as 95 wt. % or more, such as 98 wt. % or more, such as 99 wt. % or more. While the above generally refers to the solids content within the liquid media, in one embodiment, the aforementioned may also refer to the solids content of the regenerated diacid within the liquid media.

In general, while undergoing aging, the solids may be mixed within the liquid media using a mixing device or stirring device as generally known in the art. However, in certain embodiments, it should be understood that a mixing device or stirring device may not be utilized.

The temperature for the aging may be 120° C. or more, such as 130° C. or more, such as 1450° C. or more, such as 150° C. or more, such as 160° C. or more, such as 170° C. or more, such as 180° C. or more, such as 190° C. or more, such as 200° C. or more, such as 210° C. or more, such as 220° C. or more. The temperature may be 300° C. or less, such as 290° C. or less, such as 280° C. or less, such as 270° C. or less, such as 260° C. or less, such as 250° C. or less, such as 240° C. or less, such as 230° C. or less, such as 220° C. or less, such as 210° C. or less.

In one embodiment, the aging may be conducted by using thermal cycling, for instance wherein the temperature oscillates between temperatures. For instance, the thermal cycling may be over a range within 5° C., such as within 10° C., such as within 15° C., such as within 20° C., such as within 25° C. The thermal cycling may be at least 4° C. or more, such as 5° C. or more, such as 7° C. or more, such as 9° C. or more, such as 10° C. or more, such as 13° C. or more, such as 15° C. or more, such as 18° C. or more, such as 20° C. or more. The thermal cycling may be 40° C. or less, such as 35° C. or less, such as 30° C. or less, such as 25° C. or less, such as 23° C. or less, such as 20° C. or less, such as 17° C. or less, such as 15° C. or less, such as 14° C. or less, such as 12° C. or less, such as 10° C. or less, such as 9° C. or less, such as 7° C. or less. Such thermal cycling may be within the temperatures as mentioned above. As just one example, the thermal cycling may be a range of 10° C. (e.g., between 210° C. to 220° C.). As another example, the thermal cycling may be a range within 15° C. (e.g., 5° C., 10° C., etc.) within a temperature range of 180° C. or more to 250° C. or less.

The number of cycles is not necessarily limited. For instance, the number of cycles may be based on the desired size. For instance, the number of cycles may be 1 or more, such as 2 or more, such as 3 or more, such as 4 or more, such as 5 or more, such as 6 or more, such as 7 or more, such as 8 or more, such as 9 or more, such as 10 or more, such as 12 or more, such as 15 or more, such as 17 or more, such as 20 or more. The number of cycles may be 50 or less, such as 45 or less, such as 40 or less, such as 35 or less, such as 30 or less, such as 25 or less, such as 20 or less, such as 18 or less, such as 16 or less, such as 15 or less, such as 14 or less, such as 12 or less, such as 10 or less, such as 9 or less, such as 8 or less, such as 7 or less, such as 6 or less, such as 5 or less.

When increasing the temperature during the cycle, the temperature change may be at a rate of 0.5° C./min or more, such as 1° C./m in or more, such as 2° C./min or more, such as 3° C./min or more, such as 4° C./min or more, such as 5° C./min or more, such as 7° C./min or more, such as 10° C./min or more. The temperature change may be at a rate of 20° C./min or less, such as 18° C./min or less, such as 15° C./min or less, such as 13° C./min or less, such as 11° C./min or less, such as 10° C./min or less, such as 8° C./min or less, such as 6° C./min or less, such as 5° C./min or less, such as 4° C./min or less, such as 3° C./min or less, such as 2° C./min or less.

When decreasing the temperature during the cycle, the temperature change may be at a rate of 0.5° C./min or more, such as 1° C./m in or more, such as 2° C./min or more, such as 3° C./min or more, such as 4° C./min or more, such as 5° C./min or more, such as 7° C./min or more, such as 10° C./min or more. The temperature change may be at a rate of 320° C./min or less, such as 18° C./min or less, such as 15° C./min or less, such as 13° C./min or less, such as 11° C./min or less, such as 10° C./min or less, such as 8° C./min or less, such as 6° C./min or less, such as 5° C./min or less, such as 4° C./min or less, such as 3° C./min or less, such as 2° C./min or less.

In general, the regenerated composition may undergo a temperature change and/or cycling within a single device. Alternatively, the regenerated composition may undergo a temperature change or be subjected to a different temperature using a second device. For instance, the regenerated composition may be within a first device at a first temperature as indicated above wherein the regenerated composition is then transferred to a second device at a second temperature as indicated above. In this regard, the regenerated composition may be cycled between the first and second devices thereby undergoing a temperature change within each respective device.

Similarly, the regenerated composition may be within a first device at a first temperature as indicated above wherein at least a portion of the regenerated composition is transferred through a second device at a second temperature as indicated above. In this regard, at least a portion of the regenerated composition may be cycled between the first and second devices thereby undergoing a temperature change within each respective device.

In this regard, one of the first temperature and the second temperature is generally greater than the other. In this regard, without intending to be limited by theory, smaller crystals of the regenerated diacid may dissolve at a higher temperature thereby growing onto the existing crystals when subjected to the lower or cooler temperature of the cycle. Accordingly, the amount of nucleation thereby creating newer crystals resulting in a smaller size may be minimized or prevented.

As a further example, the regenerated composition may be within one device at one temperature. Thereafter, in order to age the crystals, at least a portion of the regenerated composition may be circulated or cycled through a second device, such as a heat exchanger, at a second and higher temperature. Alternatively, at least a portion of the regenerated composition may be circulated or cycled through a second device, such as a cooler or cooling device, at a second and lower temperature. Regardless of the approach, the cycling with the change in temperature can assist in controlling the growth of the crystals of the regenerated diacid.

The temperature may be increased using means in the art. For instance, the temperature may be increased by using a heating device, warm or hot air, a heat exchanger, etc. Furthermore, depending on the method, the cycling and aging may be conducted in a batch process. In another embodiment, the cycling and aging may be conducted in a continuous or semi-continuous process.

The temperature may also be decreased using means in the art. For instance, the temperature may be decreased using cooled air, a chiller or cooler, etc. Upon obtaining the desired size, the regenerated composition including the regenerated diacid and catalyst may be separated from the liquid media using mechanical means. For instance, the separation may be conducted using means generally known in the art, such as filtration (e.g., filter press), centrifugation, decanting, etc. Alternatively, the solids may simply be allowed to settle wherein the liquid media is removed. Thereafter, the solids may be allowed to dry using means generally known in the art. Furthermore, the regenerated composition having been aged and purified may also have the characteristics as mentioned above regarding the weight percentages, etc.

As indicated herein, the regenerated composition comprises a regenerated diacid and a catalyst. In one embodiment, a catalyst may not be introduced during the depolymerization reaction as described herein. In another embodiment, such a catalyst may not be introduced during any step of the depolymerization process as described herein. For instance, a catalyst may not be added to the feedstock prior to undergoing depolymerization.

Furthermore, in one embodiment, a catalyst typically employed in the polymerization of a diacid and a diol for formation of a polyester may not be introduced during the depolymerization reaction as described herein. In another embodiment, such a catalyst may not be introduced during any step of the depolymerization process as described herein. For instance, a catalyst may not be added to the feedstock prior to undergoing depolymerization.

In addition, the regenerated diacid may have a peak temperature that is within a certain number of degrees of the peak temperature of a standard reference as determined according to differential scanning calorimetry. For example, if the regenerated diacid is a regenerated terephthalic acid, the peak temperature may be within a certain number of degrees of the peak temperature of a standard terephthalic acid reference. For instance, such difference may be within 10 degrees, such as within 9 degrees, such as within 8 degrees, such as within 7 degrees, such as within 6 degrees, such as within 5 degrees, such as within 4.5 degrees, such as within 4 degrees, such as within 3.5 degrees, such as within 3 degrees, such as within 2.5 degrees, such as within 2 degrees, such as within 1.5 degrees, such as within 1 degree.

For such determination, differential scanning calorimetry may be performed using a TA Instruments Discovery Model DSC utilizing a "heat-cool-heat" method to remove any thermal history based on processing history. The second heating scan may be performed from (either 0° C. or −90° C.) to 325° C. at a rate of 10° C./minute.

Similarly, the regenerated diacid may have an onset temperature that is within a certain number of degrees of the onset temperature of a standard reference as determined according to thermogravimetric analysis. For example, if the regenerated diacid is a regenerated terephthalic acid, the onset temperature may be within a certain number of degrees of the onset temperature of a standard terephthalic acid reference. For instance, such difference may be within 10 degrees, such as within 9 degrees, such as within 8 degrees, such as within 7 degrees, such as within 6 degrees, such as within 5 degrees, such as within 4.5 degrees, such as within 4 degrees, such as within 3.5 degrees, such as within 3 degrees, such as within 2.5 degrees, such as within 2 degrees, such as within 1.5 degrees, such as within 1 degree, such as within 0.5 degrees. For such determination, thermogravimetric analysis may be performed using a TA Instruments Discovery Model TGA utilizing a temperature ramp from room temperature to 700° C. at a rate of 20° C./minute under nitrogen atmosphere.

Furthermore, as indicated above, the depolymerization may be conducted in a suitable apparatus, such as a reactor or a vessel. In this regard, any subsequent steps (e.g., clarification, decolorization, separation, precipitation) may also be conducted in an appropriate apparatus. In this regard, the apparatus for conducting such steps is also not limited by the present invention. Furthermore, to the extent necessary, the apparatuses may be connected together using various pipes, tubes, pumps, tanks, valves, etc.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A method of forming a polyester from a regenerated composition comprising a regenerated diacid and a catalyst obtained from depolymerization of a polyester containing the catalyst in a waste material wherein the catalyst was utilized to form the polyester and wherein the catalyst is present in the regenerated composition in an amount greater than 10 ppm, the method comprising:
    reacting a diol and the regenerated diacid in the regenerated composition to form one or more compounds including an ester bond;
    optionally providing additional catalyst; and
    polymerizing the one or more compounds including an ester bond to form a polyester.

2. The method of claim 1, wherein the catalyst in the regenerated composition comprises germanium, titanium, cobalt, molybdenum, or a mixture thereof.

3. The method of claim 1, wherein the catalyst in the regenerated composition comprises antimony.

4. The method of claim 1, wherein the catalyst in the regenerated composition comprises an antimony acetate, an antimony trioxide, antimony glycolate, an antimony/metal composite, or a mixture thereof.

5. The method of claim 1, wherein additional catalyst is provided.

6. The method of claim 5, wherein the additional catalyst comprises antimony.

7. The method of claim 1, wherein the catalyst is present in the regenerated composition in an amount of from greater than 10 ppm to 300 ppm.

8. The method of claim 1, wherein the catalyst is present in the regenerated composition in an amount of from greater than 0 wt. % to 0.05 wt. % or less based on the weight of the regenerated diacid.

9. The method of claim 1, wherein additional catalyst is not provided for the polymerization.

10. The method of claim 1, wherein the regenerated diacid comprises an aromatic diacid.

11. The method of claim 10, wherein the aromatic diacid comprises a terephthalic acid.

12. The method of claim 1, wherein the diol comprises an aliphatic diol.

13. The method of claim 12, wherein the diol comprises ethylene glycol.

14. The method of claim 1, wherein the molar ratio of the diol to the regenerated diacid is from 1 or more to 5 or less.

15. The method of claim 1, wherein the waste material is a waste textile.

16. The method of claim 1, wherein the depolymerization of the polyester in the waste material comprises:
    supplying the waste material comprising the polyester to a depolymerization vessel;
    depolymerizing the polyester to form a depolymerized mixture comprising a regenerated diol, the regenerated diacid, and the catalyst;
    isolating the regenerated diacid and the catalyst from the regenerated diol to form the regenerated composition including the regenerated acid and the catalyst; and
    separating the regenerated composition from the regenerated diol.

17. The method of claim 16, wherein the isolating step comprises precipitating the regenerated diacid and the catalyst.

18. The method of claim 17, wherein the precipitating step comprises adding a strong acid to the depolymerized mixture.

19. The method of claim 17, wherein the precipitating step is conducted at two intervals, each at a different pH.

20. The method of claim 1, wherein the waste material comprises a polyester and at least one other polymer.

21. The method of claim 20, wherein the at least one other polymer comprises cellulose or a polyamide.

* * * * *